United States Patent [19]
Uno et al.

[11] 3,837,441
[45] Sept. 24, 1974

[54] SPRING BRAKE
[75] Inventors: Naoyuki Uno, Kawagoe; Koichiro Watanabe, Funabashi, both of Japan
[73] Assignee: Asahi Kogaku Kogyo Kabushiki Kaisha, Tokyo-to, Japan
[22] Filed: Apr. 3, 1973
[21] Appl. No.: 347,568

[30] Foreign Application Priority Data
Apr. 19, 1972 Japan.......................... 47-45631[U]

[52] U.S. Cl................................ 188/82.6, 192/8 C
[51] Int. Cl............................................ F16d 51/04
[58] Field of Search............ 188/82.6, 134; 192/8 C, 192/81 C

[56] References Cited
UNITED STATES PATENTS
| | | | |
|---|---|---|---|
| 677,872 | 7/1901 | Locke | 192/81 C |
| 1,855,057 | 4/1932 | Karsten et al. | 188/134 UX |
| 2,257,273 | 9/1941 | Nasmith | 192/81 C |

Primary Examiner—Duane A. Reger
Attorney, Agent, or Firm—Steinberg & Blake

[57] ABSTRACT

A spring brake assembly particularly suitable for devices such as cameras. Inner and outer rotary members which have a common axis are turnable each with respect to the other about their common axis, the outer member having a wall extending around but spaced from the inner member so that this wall has an inner surface directed toward the inner member. A cylindrical coil spring is situated between the inner and outer members in frictional engagement with the latter inner surface, the cylindrical coil spring having an axis coinciding with the common axis of the inner and outer members and being connected at one end to the inner member for turning movement with the latter. Thus, when the inner and outer members are turned one with respect to the other in a direction tending to unwind the coil spring, the frictional engagement between the inner surface and the coil spring increases, while when the inner and outer members are turned one with respect to the other in a direction tending to wind the coil spring further, the frictional engagement between the coil spring and inner surface decreases.

6 Claims, 2 Drawing Figures

SPRING BRAKE

BACKGROUND OF THE INVENTION

The present invention relates to brakes.

In particular, the present invention relates to brakes which include a coil spring which frictionally engages a rotary member.

There are known brakes or clutches capable of transmitting rotation in only one direction, in which a coil spring is wound around and frictionally engages a shaft. The braking effect is achieved by utilizing the frictional engagement between the spring and the shaft around which it extends. When the coil spring is acted upon so as to tend to be further wound, in a direction tending to reduce the diameter of the convolutions of the coil spring, this coil spring will tightly grip the shaft which it surrounds so that the shaft and coil spring become locked to each other. A clutch or brake of such construction has already been used in relatively small, precision devices such as cameras. Thus with a conventional construction of this type the coil spring when it is unstressed has an inner diameter which is slightly smaller than the diameter of the shaft around which the coil spring extends. One end of the coil spring can be turned in one direction or the other for tending to tighten the coil spring on the shaft or to loosen it from the shaft, so as to bring about the increase or decrease in the frictional engagement between the coil spring and shaft, thus providing engagement or disengagement of the brake or clutch. Thus, such a clutch or brake utilizes the low frictional engagement between the spring and shaft when the diameter of the spring tends to increase in order to provide disengagement of the clutch or brake and the high frictional engagement between the spring and shaft when the spring is further wound to tend to reduce the diameter of its convolutions, to bring about engagement of the clutch or brake. However, such constructions are not suitable for fine, precise, relatively small mechanisms such as cameras, because a fine adjustment of the inner diameter of the spring and the outer diameter of the shaft is impossible to achieve in mechanisms such as camera mechanisms where compactness and precision are essential. With such conventional constructions the frictional force between the spring and shaft tends to be uneven depending upon the particular assembly of the various components, and the manufacture and assembly of the parts have been unavoidably accompanied by serious difficulties in order to attempt to avoid the above disadvantages.

SUMMARY OF THE INVENTION

It is accordingly a primary object of the present invention to provide a spring brake assembly of the above general type which will avoid the above drawbacks.

Thus, it is an object of the invention to provide a spring brake assembly of the above type which is compact and precise in its operation, avoiding any uneven operation and providing a simple, convenient, inexpensive manufacture and assembly.

In particular, it is an object of the present invention to provide a spring brake assembly of the above general type which is particularly suitable for small precise mechanisms such as cameras and which in addition can be adjusted so as to regulate in a very precise manner the friction of the assembly.

According to the invention, the brake assembly includes inner and outer coaxial rotary members which are turnable each with respect to the other about their common axis. The outer member has a wall which extends around but is spaced from the inner member so that this wall has an inner surface directed toward the inner member. A cylindrical coil spring is situated between the inner and outer members in frictional engagement with the latter inner surface, this coil spring having an axis which coincides with the common axis of the inner and outer members. One end of the coil spring is connected to the inner member for rotary movement therewith, so that when the inner and outer members are turned one with respect to the other in a direction tending to unwind the coil spring, the frictional engagement between the coil spring and inner surface will increase, while when the inner and outer members are turned one with respect to the other in a direction tending to wind the spring further, so as to tend to reduce the diameter of the convolutions thereof, the frictional engagement between the coil spring and inner surface will decrease.

BRIEF DESCRIPTION OF DRAWINGS

The invention is illustrated by way of example in the accompanying drawings which form part of this application and in which.

DESCRIPTION OF A PREFERRED EMBODIMENT

Figure 1:
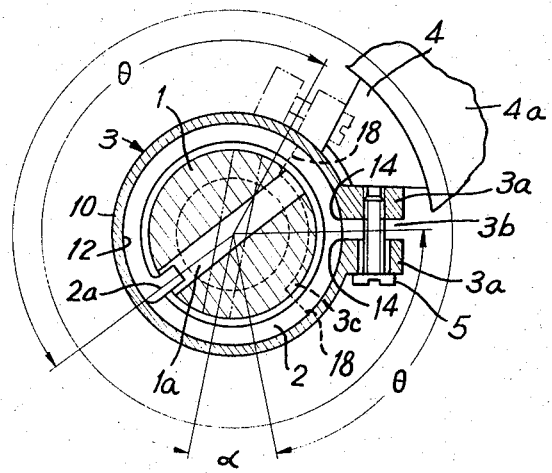
FIG. 1 is a transverse sectional illustration of a brake assembly according to the invention, taken in a plane normal to the axis of the assembly.

Referring to the drawings, it will be seen that the brake assembly of the invention includes an inner rotary member 1 in the form of a turnable shaft capable or rotating in opposite directions through an angle $\theta + \alpha$, as indicated in FIG. 1 and described in greater detail below. A coil spring 2 is coiled around the shaft while being spaced outwardly therefrom, except for an end 2a of the coil spring, this end 2a extending into a transverse bore 1a which is formed in the shaft 1. In this way the end 2a of the spring 2 is connected to the shaft 1 for rotary movement therewith.

The cylindrical coil spring 2 has an axis which coincides with the axis of the inner member 1, and the coil spring 2 is surrounded by an outer member 3 which also has an axis coinciding with the common axis of the shaft 1 and the spring 2. This outer member 3 has a wall 10 which extends almost completely around the shaft 1, this wall 10 being spaced from the shaft 1 and having an inner surface 12 which is directed toward the shaft 1 and which is frictionally engaged by the spring 2. The spring 2, when it is in an unstressed condition, has an outer diameter which is slightly larger than the inner diameter of the wall 10, so that in this way there will be a frictional engagement between the spring 2 and the wall 10.

The wall 10 of the outer member 3 terminates in a pair of free edges 14 which are parallel to the common axis of the inner member 1 and outer member 3 and which are located adjacent but spaced from each other. The outer member 3 also has at its wall 10 a pair of extensions 3a which are fixed to the wall 10 at the free edges 14 thereof and which extend from these free edges 14 outwardly away from the common axis of the inner member 1 and the outer member 3. Thus, these extensions 3a define between themselves a gap 3b.

An adjuting means is operatively connected with the outer member 3, which is made of a springy resilient material capable of yielding, for adjusting the width of the gap 3b. In the illustrated example this adjusting means takes the form of a screw 5 which extends freely through an opening formed in one of the extensions 3a into a threaded bore formed in the other of the extensions 3a. Thus, referring to FIG. 1, it will be seen that the upper extension 3a is formed with an internally threaded bore into which the screw 5 is threaded, while the lower extension 3a has a bore larger than the threaded shank of the screw 5. Thus, by turning the screw 5 it is possible to either draw the extensions 3a toward each other to reduce the width of the gap 3b or to permit this gap to become wider due to the resiliency of the wall 10.

Figure 2:
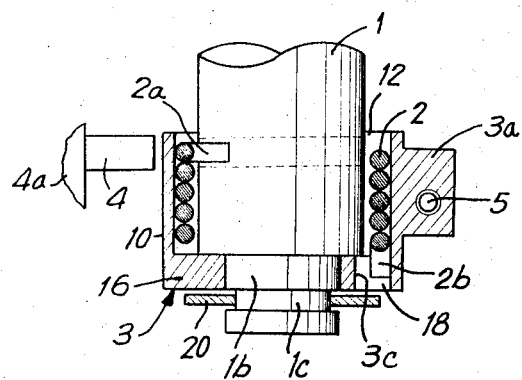
FIG. 2 is a partly sectional elevation of the assembly of FIG. 1, with a stop means of FIG. 1 shown at a location different from that of FIG. 1 for a clearer illustration of the components.

As is apparent particularly from FIG. 2, the outer member 3 has a transverse wall 16 which is normal to the common axis of the inner member 1 and the outer member 3, and this transverse wall 16 is formed with an opening which receives a reduced diameter portion 1b of the shaft 1, so that in this way a bearing is formed between the inner member 1 and the outer member 3. The outer member 3 is formed at its transverse wall 16 with an arcuate peripheral notch 3c, extending through approximately 90°, as shown in FIG. 1, through equal distances in opposite directions beyond the gap 3b. This arcuate peripheral notch 3c terminates in a pair of opposed ends 18, and the wall 10 has a pair of free end portions which extend toward each other beyond the ends 18 of the peripheral notch 3c, so that in this way the wall 10 will have the springy yieldable free end portions which are fixed with the extensions 3a which can be acted upon by the adjusting means 5 so as to regulate the force of friction between the spring 2 and the inner surface 12 of the wall 10.

Beyond its part 1b which is situated in the opening of the transverse wall 16, the shaft 1 is formed with a circular groove 1c, and a support member 20 extends into this groove as shown at the lower part of FIG. 2.

In addition, the structure illustrated in FIGS. 1 and 2 includes a stop means for limiting the extent of turning of the components. In the illustrated example this stop means includes a stationary projection 4 which is carried by any stationary supporting structure 4a. This stationary projection 4 is situated in the path of turning of the extensions 3a. Thus, when the outer member 3 turns in a counterclockwise direction, as viewed in FIG. 1, to the solid line position indicated in FIG. 1, the lower edge of the projection 4 will be engaged by one of the extensions 3a, while when the outer member 3 turns in a clockwise direction to the dot-dash line position shown in FIG. 1, the other extension 3a will engage the upper edge of the stop member 4. Thus, the maximum angle of turning of the outer member 3 is $\theta$, and the inner member 1 can turn through the additional angle $\alpha$, during the final braking or during the initial release.

The stop member 4 is shown in FIG. 2 at a different location from in FIG. 1 for the sake of clarity, so that part of the stop member will not be hidden behind the extension 3a which is shown in FIG. 2. Thus, FIG. 2 brings out that while the stop member 4 extends to the elevation of the upper portion of the extensions 3a, as viewed in FIG. 2, it does not extend down to the elevation of the adjusting means 5.

With the structure of the invention described above, rotation is transmitted from the shaft 1 to the spring 2 because of the connection of these components by extension of the end 2a of the spring 2 into the bore 1a. Rotation is then transmitted frictionally to the outer member 3 from the spring 2. At the end of rotation of the shaft 1 in a counterclockwise direction, as viewed in FIG. 1, tending to wind the spring 2 further, or in other words tending to reduce the diameter of the convolutions thereof, the outer member 3 turns until it engages the stop means 4, in the manner shown in solid lines in FIG. 1.

It is to be noted that the end 2b of the spring 2, opposite from the end 2a thereof, extends parallel to the common axis of the members 1 and 3 and is situated in the notch 3c so that the spring 2 has a free end 2b which is not connected to any of the other elements.

Assuming now that the shaft 1 is rotated in a clockwise direction, as viewed in FIG. 1, which is the direction in which the spring 2 tends to become unwound, or in other words the direction in which the convolutions of the spring 2 tend to increase their diameter, then the outer member 3 is also rotated in a clockwise direction until it engages the stop means 4, as shown in dot-dash lines in FIG. 1. In this way it is possible for the outer member 3 to turn through the angle $\theta$. Of course, it is also possible at this time for the rotation to be initiated at the outer member 3 which if it is turned in a clockwise direction from the solid to the dot-dash line position of FIG. 1 will transmit its rotary movement through the spring 2 to the shaft 1 to rotate the latter also in a clockwise direction, due to the frictional engagement between the spring 2 and outer member 3, this frictional engagement tending to increase because of the tendency of the spring to become unwound during clockwise rotation of member 3 with respect to member 1, as viewed in FIG. 1.

When the outer member 3 has reached the end of its clockwise turning movement, as viewed in FIG. 1, the shaft 1 can continue to turn in a clockwise direction in the event that the rotating force of the shaft 1 is strong enough, and the spring 2 will at this time slip with respect to the inner surface 12 while the shaft 1 continues to rotate through the additional angle $\alpha$. Thus at this time during rotation of the shaft 1 through the additional angle $\alpha$, only the shaft 1 and the spring 2 turn with respect to the stationary member 3. However, at this time the frictional force between the spring 2 and the inner surface 12 of the outer member 3 is extremely high so that the force of friction increases very greatly during the additional rotation of the member 1 through the angle $\alpha$, and thus the braking force is achieved so that the shaft 1 is brought effectively to a stop after turning through the additional angle $\alpha$.

Now when the shaft 1 is rotated in a counterclockwise direction, as viewed in FIG. 1, the outer member 3 will turn until it again reaches the solid line position shown in FIG. 1, since it will be stopped by the stop means 4 after returning through the angle $\theta$, but at this time the shaft 1 turns in a direction which tends to wind the spring 2 further, or in other words in a direction tending to reduce the diameter of the convolutions of the spring 2, so that a smooth slippage is provided between the surface 12 and the spring 2, and almost no energy is consumed during rotation of the shaft 1 through the additional angle α, when the shaft 1 returns to its initial position.

Thus, with the structure of the invention because the outer member 3 has the wall 10 provided with the inner surface which extends around and frictionally engages the coil spring 2, it is possible to effectively regulate the frictional force between the coil spring 2 and the inner surface 12 by way of the adjusting means 5. Thus the brake assembly of the invention is capable of being very easily manufactured and assembled while achieving a uniform braking operation with a precise regulation. The precision of the assembly of the invention, both with respect to its construction and its operation, is sufficiently high to make such an assembly ideal for use in relatively small precision mechanisms such as cameras, while avoiding the various problems encountered when attempts are made to use conventional spring brakes in small precision devices.

What is claimed is:

1. A brake assembly comprising inner and outer coaxial rotary members turnable each with respect to the other about their common axis, said outer member having a wall extending at least partly around and spaced from said inner member so that said wall of said outer member has an inner surface directed toward said inner member, and a cylindrical coil spring situated between said inner and outer members, frictionally engaging said inner surface, having an axis coinciding with the common axis of said members, and connected at one end to said inner member so as to turn at said one end together with said inner member, whereby when said members turn one with respect to the other in a direction tending to unwind said coil spring the frictional engagement of the latter with said inner surface increases while when said members turn one with respect to the other in a direction tending to wind said coil spring further so as to tend to reduce the diameter of the convolutions thereof, the frictional engagement between the coil spring and said inner surface decreases, said wall of said outer member being springy and yieldable, and adjusting means operatively connected to said wall of said outer member for adjusting the diameter of a cylinder which is defined at least in part by said inner surface, so as to regulate the frictional engagement between said inner surface and said spring.

2. The combination of claim 1 and wherein said wall of said outer member extends almost completely around said inner member and termintes in a pair of free edges which are parallel to the common axis of said members and which are spaced from but adjacent each other, and said outer member including a pair of extensions respectively fixed to said free edges and extending therefrom outwardly away from said common axis with said extensions defining a gap between themselves, said adjusting means being operatively connected to said extensions for controlling the width of said gap.

3. The combination of claim 2 and wherein said adjusting means includes at least one threaded member extending through one of said extensions and threaded into the other for drawing said extensions to each other to reduce the width of said gap or for releasing said extensions to move apart from each other due to the resiliency of said wall to increase the width of said gap.

4. A brake assembly comprising inner and outer coaxial rotary members turnable each with respect to the other about their common axis, said outer member having a wall extending at least partly around and spaced from said inner member so that said wall of said outer member has an inner surface directed toward said inner member, and a cylindrical coil spring situated between said inner and outer members, frictionally engaging said inner surface, having an axis coinciding with the common axis of said members, and connected at one end to said inner member so as to turn at said one end together with said inner member, whereby when said members turn one with respect to the other in a direction tending to unwind said coil spring the frictional engagement of the latter with said inner surface increases while when said members turn one with respect to the other in a direction tending to wind said coil spring further so as to tend to reduce the diameter of the convolutions thereof, the frictional engagement between the coil spring and said inner surface decreases, stop means coacting with said outer member for limiting the extent to which the latter can turn about the common axis of said members, said outer member extending almost completely around said inner member and terminating in a pair of free edges which are parallel to said common axis, said outer member having a pair of extensions fixed to said free edges, respectively, and extending outwardly therefrom away from said common axis, said extensions defining a gap between themsleves, and adjusting means operatively connected with said extensions for controlling the width of said gap and thus controlling the frictional engagement between said inner surface and said spring, said stop means including a stationary projection situated in the path of turning movement of said extensions to engage one of said extensions when said outer member turns in one direction and the other of said extensions when said outer member turns in an opposite direction, for thus limiting the extent to which said outer member can turn.

5. A brake assembly comprising inner and outer coaxial rotary members turnable each with respect to the other about their common axis, said outer member having a wall extending at least partly around and spaced from said inner member so that said wall of said outer member has an inner surface directed toward said inner member, and a cylindrical coil spring situated between said inner and outer members, frictionally engaging said inner surface, having an axis coinciding with the common axis of said members, and connected at one end to said inner member so as to turn at said one end together with said inner member, whereby when said members turn one with respect to the other in a direction tending to unwind said coil spring the frictional engagement of the latter with said inner surface increases while when said members turn one witg respect to the other in a direction tending to wind said coil spring further so as to tend to reduce the diameter of the convolutions thereof, the frictional engagement between the coil spring and said inner surface decreases, said outer member including a transverse wall extending perpendicularly to said common axis and formed with an opening in which part of said inner member is located to provide a bearing between said inner and outer members, said transverse wall being formed with aperipheral arcuate notch situated beyond said opening thereof, and said wall of said outer member which extends around said inner member while being spaced therefrom having free end portions which respectively extend byond the ends of said notch toward each other.

6 The combination of claim 5 and wherein said free end portions respectively terminate in free edges which extend parallel to the common axis of said members, said outer members having a pair of extensions fixed to said free edges, respectively, and extending outwardly therefrom away from said common axis, said adjusting means being operatively connected with said extensions for controlling the distance therebetween so as to regulate the frictional engagement between said coil spring and said inner surface.

\* \* \* \* \*